US012798715B2

(12) United States Patent
Bryant

(10) Patent No.: US 12,798,715 B2
(45) Date of Patent: Nov. 17, 2026

(54) TWO-WHEELED VEHICLE FRAME WITH CONTROLLABLE DYNAMICS

(71) Applicant: Robert H. Bryant, Bellevue, WA (US)

(72) Inventor: Robert H. Bryant, Bellevue, WA (US)

(73) Assignee: Bryant Engineering & Development, LLC, Bellevue, WA (US)

(*) Notice: Subject to any disclaimer, the term of this patent is extended or adjusted under 35 U.S.C. 154(b) by 0 days.

(21) Appl. No.: 19/417,130

(22) Filed: Dec. 11, 2025

(65) Prior Publication Data

US 2026/0167295 A1 Jun. 18, 2026

Related U.S. Application Data

(60) Provisional application No. 63/734,552, filed on Dec. 16, 2024.

(51) Int. Cl.

*B62K 21/00* (2006.01)
*B62J 45/20* (2020.01)
*B62J 45/414* (2020.01)
*B62J 45/415* (2020.01)

(52) U.S. Cl.

CPC ............... *B62K 21/00* (2013.01); *B62J 45/20* (2020.02); *B62J 45/414* (2020.02); *B62J 45/4151* (2020.02)

(58) Field of Classification Search

CPC ......... B62K 21/00; B62J 45/20; B62J 45/414; B62J 45/4151

See application file for complete search history.

(56) References Cited

U.S. PATENT DOCUMENTS

| | | | | |
|---|---|---|---|---|
| 8,231,135 B2 | | 7/2012 | Mercat | |
| 8,251,390 B2 | | 8/2012 | Reichstetter et al. | |
| 8,706,390 B2 | | 4/2014 | Kim et al. | |
| 11,299,230 B1 | | 4/2022 | Li | |
| 2005/0023062 A1 | * | 2/2005 | Czysz | B62K 25/02 180/219 |
| 2013/0054126 A1 | * | 2/2013 | Lazzari | B62K 11/00 701/124 |
| 2014/0265224 A1 | * | 9/2014 | Takenaka | B62K 21/10 280/274 |

(Continued)

FOREIGN PATENT DOCUMENTS

| | | | |
|---|---|---|---|
| CN | 105026198 | A | 11/2015 |
| WO | 2002090173 | A1 | 11/2002 |

(Continued)

OTHER PUBLICATIONS

International Search Report and Written Opinion for Counterpart PCT Application PCT/US2025/059274, Mailed Apr. 24, 2026, ISA/KR.

(Continued)

*Primary Examiner* — Russell Frejd
(74) *Attorney, Agent, or Firm* — Cozen O'Connor

(57) ABSTRACT

A control system for a two-wheeled vehicle having a main frame and a steering frame, the control system may include one or more of: (a) an auxiliary angular momentum ($A^2M$) system operative to produce angular momentum to be added to, or subtracted from, angular momentum of a steering wheel that is steerable with the steering frame; and an adjustable trail (AT) system operative to vary a trail of the steering wheel.

18 Claims, 13 Drawing Sheets

(56) References Cited

U.S. PATENT DOCUMENTS

| | | | | |
|---|---|---|---|---|
| 2015/0307152 A1* | 10/2015 | Van Steenwyk | B60G 3/185 | |
| | | | 280/276 | |
| 2016/0137258 A1* | 5/2016 | Alvarez-Icaza | B62K 17/00 | |
| | | | 280/270 | |
| 2019/0111982 A1* | 4/2019 | Gordner | B62K 11/00 | |
| 2019/0232968 A1 | 8/2019 | Reynolds et al. | | |
| 2020/0102043 A1 | 4/2020 | Zhang et al. | | |
| 2025/0360973 A1* | 11/2025 | Pilon | B62K 21/00 | |

FOREIGN PATENT DOCUMENTS

| | | |
|---|---|---|
| WO | 2015049418 | 4/2015 |
| WO | 2024065030 | 4/2024 |
| WO | 2024065030 A1 | 4/2024 |

OTHER PUBLICATIONS

J. D. G. Kooijman et al. "A bicycle can be self-stable without gyroscopic or caster effects", Science Magazine, vol. 332 No. 6027 pp. 339-342, Apr. 15, 2011, doi:10.1126/science.1201959.

D.J.N. Limebeer, et al. "Bicycles, Motorcycles and Models: Single-track Vehicle Modeling and Control" (Oct. 2006).

* cited by examiner

TWO-WHEELED VEHICLE FRAME WITH CONTROLLABLE DYNAMICS

PRIOR APPLICATION

This Application claims the benefit of U.S. Provisional Application No. 63/734,552 filed Dec. 16, 2024, the disclosure of which is incorporated by reference herein.

TECHNICAL FIELD

Embodiments described herein generally relate to two-wheeled vehicles such as bicycles, e-bikes, scooters and motorcycles and, more particularly, to variable frame geometry and stabilization of such vehicles.

BACKGROUND

Two-wheeled vehicles, such as bicycles, e-bikes, scooters, and motorcycles (which will be referred to for brevity simply as bicycles), are ubiquitous in our everyday experience. As most of us learn early through firsthand experience, these vehicles, are inherently unstable: absent control by a rider or an automated control system, a bicycle would fall over when traveling at low speed. However, at relatively high speeds, as when coasting down a hill, bicycles tend to have self-stabilizing characteristics.

The dynamics and rideability of a bicycle are, to a large degree, determined by two features of the bicycle's design. These two features are (1) angular momentum ("AM") of the front wheel (typically, the steering wheel) and (2) the trail. The AM of the front when is defined as the product of the wheel's moment of inertia (which depends on the wheel's mass distribution) and its angular velocity. The faster the wheels spin or the more massive they are, the greater the AM. A greater AM resists changes in the orientation of the wheel, thus helping to keep the bicycle upright and stable when in motion.

In other words, the AM of the wheels creates a gyroscopic effect that causes the bicycle to resist tipping. When the bicycle leans to one side, the AM works to reorient the bicycle's vertical axis and bring it back upright. While this effect is beneficial for stability, it can also make quick direction changes more challenging at higher speeds due to the increased resistance to tilting. Moreover, under certain conditions, the gyroscopic effect can lead to oscillations if the system becomes unstable. For example, if the rider's weight or position causes a shift that initiates a slight wobble, the gyroscopic effect can amplify these small oscillations rather than dampening them. This results in the front wheel beginning to oscillate from side to side, i.e., shimmy.

A key factor in shimmy is the flexibility of the bicycle frame and fork. If the frame or fork has some degree of flexibility, it can amplify oscillations when combined with the gyroscopic forces of the wheels. AM from the wheels interacts with this flexing, and the natural frequency of the bicycle system can align with the frequency of the wobbling, exacerbating the shimmy. In extreme cases, this can lead to significant instability. In some cases, the steering oscillation can become a resonance issue, where the natural frequency of the system (including the frame, wheels, and rider) matches the frequency of the steering wobble. At high speeds, this can lead to an uncontrollable shimmy, where the steering oscillations rapidly grow.

AM contributes to the shimmy by sustaining the oscillation, preventing the system from naturally damping out the wobble. At high speeds, the wheel's AM makes it more difficult for the front wheel to realign quickly once a wobble starts. The increased gyroscopic forces from the spinning wheels, while generally stabilizing in normal conditions, can contribute to an oscillation that doesn't self-correct easily. This is because the AM resists rapid changes in the direction of the front wheel's rotation, prolonging the wobble before it is damped out (if it ever is).

Trail is another key design feature related to the geometry of the front fork and how the front wheel touches the ground. It refers to the point of contact of the front wheel "trailing" behind the steering axis, and is defined as the horizontal distance between the point where the steering axis (e.g., extended through the fork) intersects the ground and the point where the front tire contacts the ground. Trail affects how the bicycle responds to steering inputs and how it handles in general. The presence of a trail creates a self-centering effect, making the bicycle more stable when moving in a straight line because the front wheel naturally wants to return to a position where it is aligned with the direction of travel. This stabilizing effect makes it easier for the rider to maintain control, especially at higher speeds.

Hence, a bicycle with more trail generally provides greater stability, but it can feel sluggish or difficult to steer quickly, making it less responsive in tight turns. Conversely, a bicycle with less trail will be more nimble and responsive to steering inputs, which can improve handling in sharp corners or technical riding situations, but may feel less stable at higher speeds.

Accordingly, the dynamic behavior of a bicycle changes as the velocity changes and can become difficult to ride as velocity changes, whether increasing or decreasing. At low speed, a bicycle must be rider-stabilized. This means that the rider's control authority is primarily used for stabilizing the bicycle, making maneuvering at low speed quite challenging for the rider. As the velocity increases to intermediate speeds, the bicycle tends to self-stabilize, thus giving the rider more control authority for maneuvering and ease of riding improves. But at higher velocity, new riding difficulties emerge. These include shimmy of the front wheel, and the need for greater force to turn the bicycle.

Various riding applications include road racing, endurance riding, touring (where cargo may be carried on the bicycle), urban riding, gravel/offroad/trail riding, mountain biking, fat biking, and bikepacking, among others. Each of these applications calls for certain bicycle handling characteristics that involve trade-offs such as stability vs. maneuverability, high-speed vs. low-speed optimized handling, and the like. Traditionally, specialized bicycle types have been developed for each of these applications, and a rider will select a bicycle having certain handling characteristics according to the type of riding application the rider expects to undertake. For example, a rider would consider whether they would use the bicycle primarily for paved roads or primarily for off-road trail or steep-terrain riding. Likewise, they would consider whether their expected riding application would include high-speed descents, tight turns, steep climbs, and the like, and select a bicycle having characteristics suited to their primary application.

But in some riding applications, such as cross-country riding over varied terrain and environments, a single ride may call for different bicycle handling characteristics at different parts of the ride. For example, a rider may prefer to have high maneuverability and stability at low speed when riding in dense urban environments with many stationary and moving obstacles such as, automobile traffic, pedestrians, curbs, potholes, intersections, light posts, children, dogs, etc. When riding in less dense environments with fewer obstacles, the rider may prefer to ride at higher speed, with less responsive (i.e., less twitchy) steering. A ride may include unpaved surfaces, such as gravel roads, dirt trails, uneven surfaces, or slick surfaces such as mud, wet grass, sandy pavement, snow, or ice. Conventionally, no one bicycle type or bicycle configuration can accommodate such a variety of riding applications.

Another type of riding application concerns bicycles with rear-wheel steering, where the rear wheel pivots to change direction while the front wheel remains fixed. This concept brings with it a host of intriguing benefits and commensurately significant challenges.

One of the primary benefits of a rear-wheel steered bicycle is its enhanced maneuverability, particularly in tight spaces. The ability to pivot the rear wheel allows for exceptionally sharp turns, making this design highly suitable for navigating confined areas or dense urban environments. The dynamics of rear-wheel steering could also unlock novel handling characteristics, offering riders an entirely different experience. Furthermore, the removal of the need for a steerable front wheel might simplify the bicycle's front-end design, paving the way for innovative suspension systems or aerodynamically optimized structures.

Rear-wheel steering also holds potential for autonomous applications. In controlled environments like warehouses or specialized transport systems, precise maneuvering is often more critical than conventional ride dynamics. A rear-wheel steered bicycle could excel in such roles, enabling fine-tuned navigation where space constraints are a concern. Additionally, under specific conditions, this design could promote straight-line stability at high speeds, much like rear-wheel steering systems in automobiles.

Despite these benefits, the practical challenges in implementing rear-wheel steering are significant. Stability, particularly at low speeds, is a primary concern. Traditional bicycles rely on AM forces and the self-centering effect of the front wheel to maintain balance. In a rear-wheel steered bicycle, these stabilizing mechanisms are disrupted as the steering wheel traces a completely different path than the tracked front wheel. The rear wheel's AM forces do little to aid stability, and the lack of a self-centering effect makes balancing more challenging. The result is a tendency toward dynamic instability, especially when the bicycle is moving slowly. While the concept of a rear-wheel steered bicycle presents interesting possibilities, to date, its practical adoption has been hindered by significant stability and handling challenges.

Practical solutions are needed to address these, and related, challenges in bicycle design.

SUMMARY

Some aspects of the disclosed subject matter are feature a riding-dynamics-control system for use with two-wheeled vehicles e.g., bicycles, e-bikes, scooters, and motorcycles, which are referred to for brevity simply as bicycles. A control system according to some embodiments includes a dynamically-adjustable angular momentum (AM) portion, and a dynamically-adjustable trail portion. Control of the adjustable AM, the trail, or the two together, allows the bicycle's handling characteristics to be adjusted to provide desired handling characteristics under varying speeds or riding conditions.

In some embodiments, an auxiliary AM ($A^2M$) system includes an actuator that produces angular momentum to be added to or subtracted from the angular momentum of the front or steering wheel in a dynamically variable, controlled fashion. In some implementations, this actuator may be an electric motor, such as a DC motor, induction motor, brushless DC motor, or switched reluctance motor, coupled with a rotating mass like a flywheel. The $A^2M$ system provides variable augmentation of angular momentum based on speed or other riding conditions. An $A^2M$ controller adjusts the output signal to achieve the desired angular momentum, taking into account the current velocity and other riding conditions.

In related embodiments, an AT system, or Adjustable Trail system, features an actuator that adjusts the trail of the bicycle by moving the steering wheel's position forwards and backwards relative to the steering frame to adjust the trail. In various implementations, this actuator can be a servo or stepping motor, pneumatic or hydraulic cylinder, or a cable and spring system. The trail can be dynamically varied according to riding conditions such as the current speed. The AT controller adjusts an output signal to achieve the desired trail based on the current velocity and other riding conditions.

In related embodiments, a combined controller architecture for both the $A^2M$ and AT systems shares inputs such as a rider user interface, an accelerometer, and a speedometer. In some implementations, despite sharing these input devices, the $A^2M$ and AT controls may be carried out independently. The rider can specify settings for both systems, either independently or combined, to achieve a desired balance between stability and maneuverability. In some embodiments, the setpoints for the $A^2M$ and AT systems are automated according to predefined values corresponding to certain riding conditions, such as speed, steering patterns, smoothness, pitch, or the like.

The $A^2M$ and AT systems work together to provide a more stable and responsive riding experience, adapting to various speeds and riding conditions to enhance both safety and performance. In addition, certain kinds of bicycle designs, such as rear-wheel-steered bicycles, may become practical with the implementation of well-controlled $A^2M$ and AT systems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The following description and the drawings sufficiently illustrate specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

According to embodiments of the present subject matter, a bicycle is provided with a dynamically-adjustable AM, and a dynamically-adjustable trail. Control of the adjustable AM, the trail, or the two together, allows the bicycle's handling characteristics to be adjusted to provide desired handling characteristics under varying speeds or riding conditions.

Figure 1:
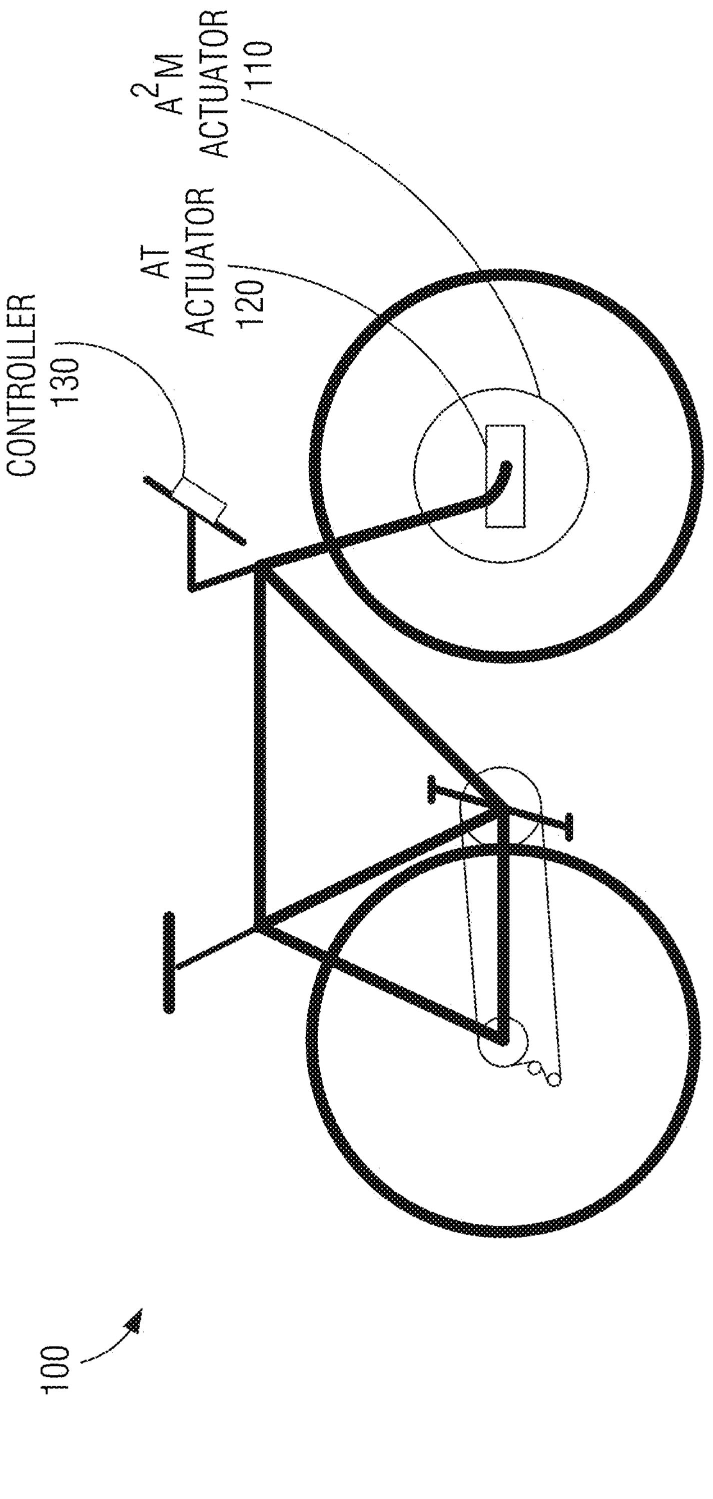
FIG. 1 is a simplified schematic diagram illustrating a bicycle as an example of a two-wheeled vehicle in which aspects of the inventive subject matter may be embodied.

FIG. 1 is a simplified schematic diagram illustrating a bicycle as an example of a two-wheeled vehicle in which aspects of the inventive subject matter may be embodied. As depicted, bicycle 100 has a conventional configuration with front-wheel steering and rear-wheel drive.

Bicycle 100 also includes an auxiliary angular momentum ($A^2M$) system, and an adjustable trail (AT) system, each of which is described in detail below. Briefly, the $A^2M$ system produces angular momentum to be added to, or subtracted from, the angular momentum of the front or steering wheel, in a dynamically variable, controlled, fashion. The AT system facilitates adjustment of the trail of bicycle 100 in a dynamically-variable, controlled, fashion.

As depicted, the $A^2M$ system includes, among other components, $A^2M$ actuator 110 and controller 130 operatively coupled to $A^2M$ actuator 110. The AT system includes, among other components, AT actuator 120 operatively coupled to controller 130. In this example, the $A^2M$ system and the AT system may share certain components, such as controller 130, control lines, mount(s), or the like.

Figure 2A:
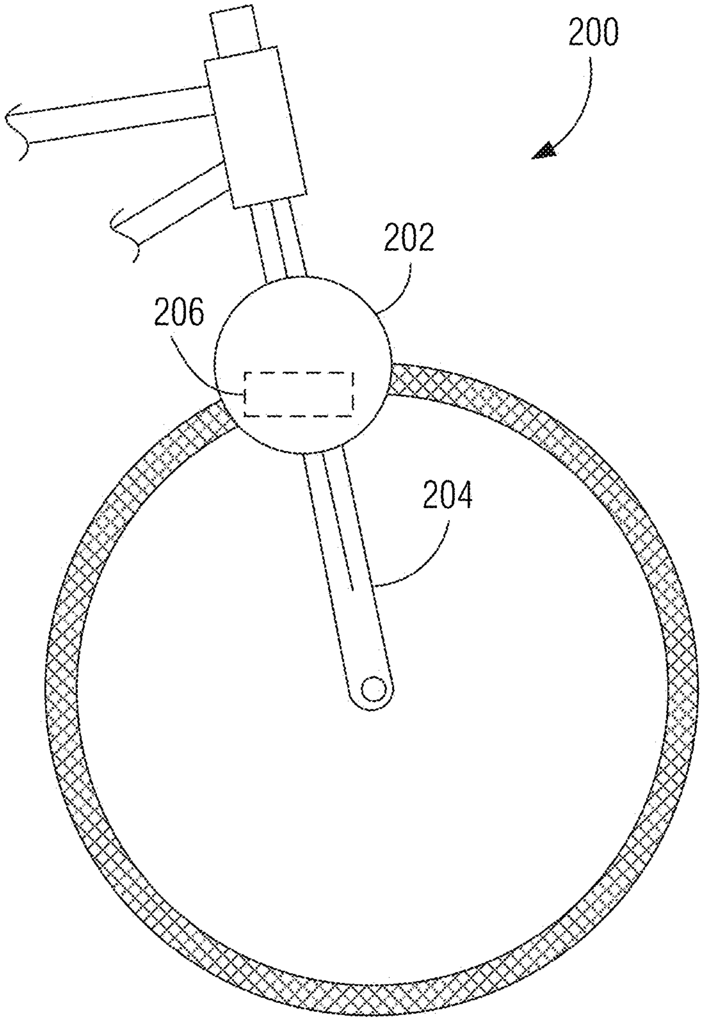
FIG. 2A is a diagram illustrating an example implementation of an auxiliary angular momentum ($A^2M$) actuator according to one type of embodiment.

FIG. 2A is a diagram illustrating an example implementation of an $A^2M$ actuator according to one type of embodiment. As depicted, $A^2M$ actuator 202 has a suitable mechanical coupling constructed to be mounted on steering frame 200, such as on fork 204. $A^2M$ actuator 202 includes an electric motor that comprises a stator and a rotor, and a rotating mass, such as a flywheel, coupled to the rotor. The electric motor may be a DC motor, an induction motor, a brushless DC motor, switched reluctance motor, or other suitable motor type. The electric motor is electrically coupled to a corresponding motor drive circuit 206, which may be situated proximate the electric motor (as depicted), or elsewhere on steering frame 200 of a bicycle.

Figure 2B:
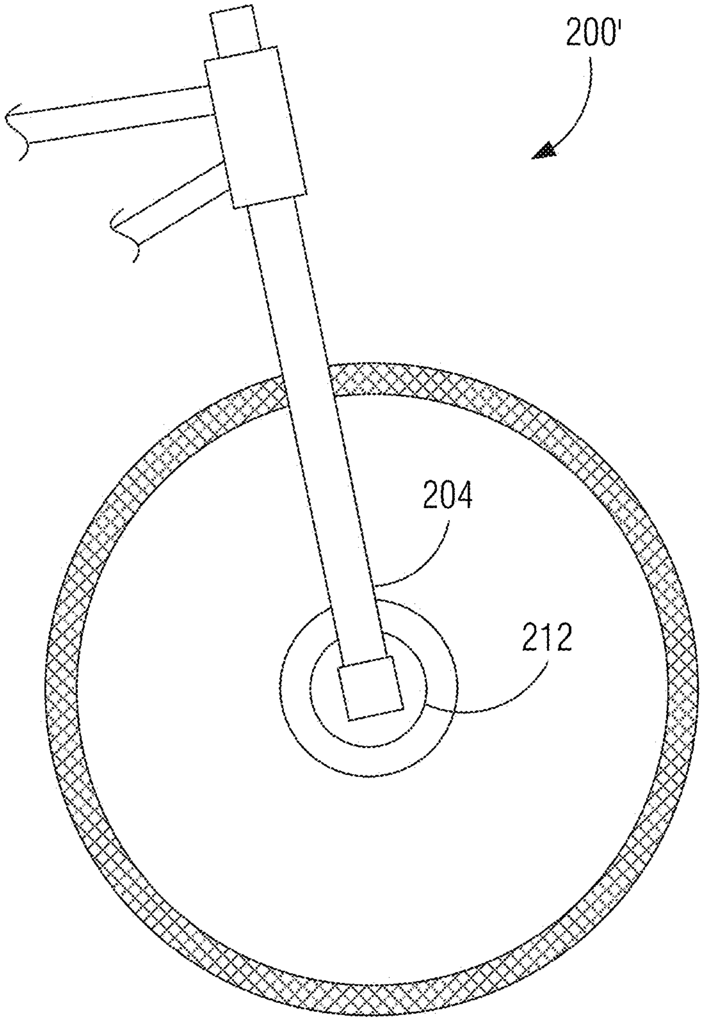
FIG. 2B is a diagram illustrating another implementation of an $A^2M$ actuator according to a related type of embodiment.

FIG. 2B is a diagram illustrating another implementation of an $A^2M$ actuator according to a related type of embodiment. As depicted, $A^2M$ actuator 212 is mounted on the stationary portion of the hub of the wheel of steering frame 200'. $A^2M$ actuator 212 may have a similar arrangement as $A^2M$ actuator 202, i.e., motor, flywheel, motor drive circuit.

Notably, with reference to FIGS. 2A and 2B, the $A^2M$ actuator 202, 212 is mounted to the steering frame of 200, 200' of each respective bicycle. Thus, $A^2M$ actuator 202, 212 is always aligned with the steering wheel of the corresponding bicycle. In related embodiments, $A^2M$ actuator 202, 212 may be duplicated, and mounted on both sides of the fork or steering wheel. Such a configuration may improve weight distribution and associated handling characteristics of the bicycle, and provide stronger AM control.

Figure 2C:
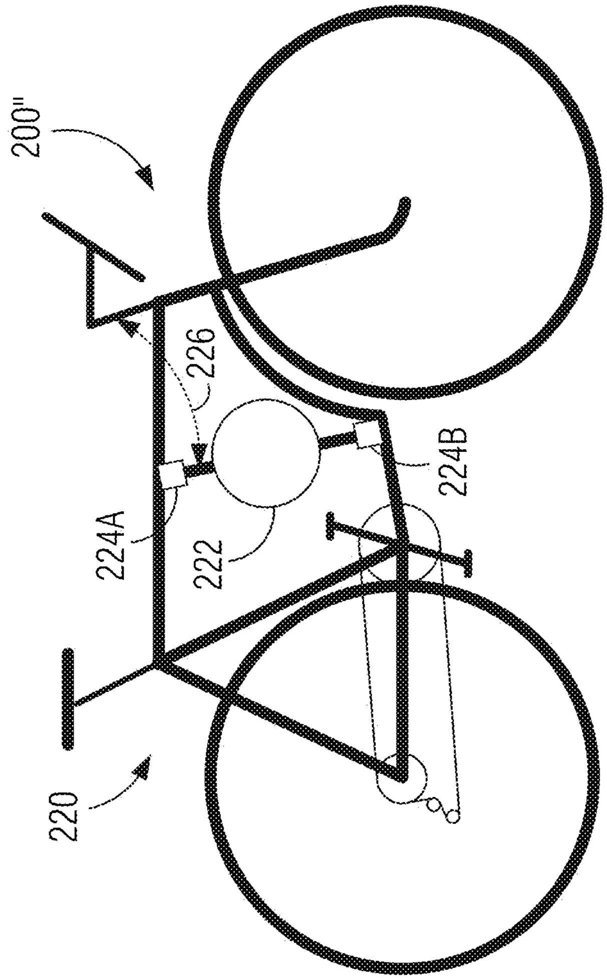
FIG. 2C is a diagram illustrating yet another implementation of an $A^2M$ actuator according to a related type of embodiment.

FIG. 2C is a diagram illustrating yet another implementation of an $A^2M$ actuator according to a related type of embodiment. As depicted, $A^2M$ actuator 222 is mounted on main frame 220 via hinges 224A and 224B. Hinges 224A and 224B permit $A^2M$ actuator 222 to pivot $A^2M$ actuator 222 such that it maintains an orientation consistent with the steering wheel. Accordingly, coupling 226 (shown schematically) between steering frame 200" and $A^2M$ actuator 222 may be provided. Coupling 226 may be implemented with linkages, cables, electromechanically (e.g., with an actuator such as a servo motor, motor controller, and sensor that measures the steering position of the steering frame), or other suitable means. $A^2M$ actuator 212 may have a similar arrangement as $A^2M$ actuator 202, i.e., motor, flywheel, motor drive circuit, etc.

Figure 3:
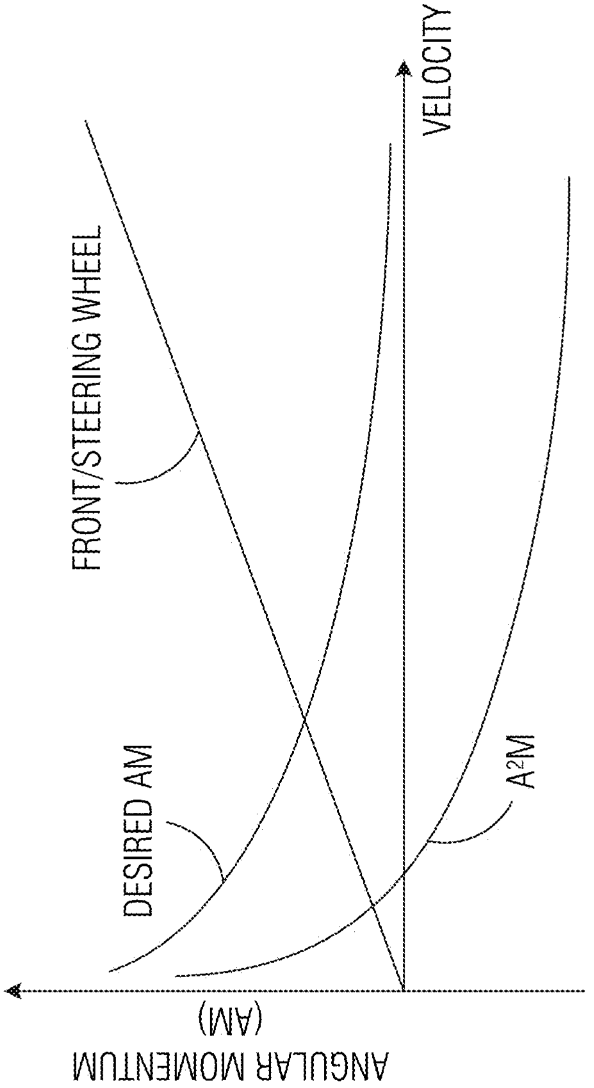
FIG. 3 is a graph that illustrates functionality of $A^2M$ actuator 202, 212, and 222.

In operation, $A^2M$ actuator 202, 212, and 222 produces AM to augment the AM that is produced by the steering wheel. The augmentation of AM may be used to increase the overall AM, or decrease the overall AM of the bicycle at a given operating point. The augmentation of AM may be variable as a function of speed or other riding condition. FIG. 3 is a graph that illustrates functionality of $A^2M$ actuator 202, 212, and 222. In FIG. 3, the independent variable, velocity, represents the speed of the bicycle, while the dependent variable, AM, represents the angular momentum of the steering wheel (typically, the front wheel). As shown, the AM of the front/steering wheel increases linearly with increasing velocity. The curve marked Desired AM indicates the target AM to be achieved by operation of $A^2M$ actuator 202, 212, and 222.

As shown in this example, the desired AM is greatest at low speed, and decreases inversely with velocity. In other examples, different relationships of AM to velocity may be desired, which would have different curves. To achieve the desired AM, the $A^2M$ actuator superimposes additional AM (which may be positive or negative, depending on the direction of rotation of the $A^2M$ actuator's rotor) to add to, or subtract from, the AM of the steering wheel. In the example shown, positive values of the $A^2M$ curve add to the AM of the steering wheel, whereas negative values of $A^2M$ subtract from the AM of the steering wheel.

Figure 4:
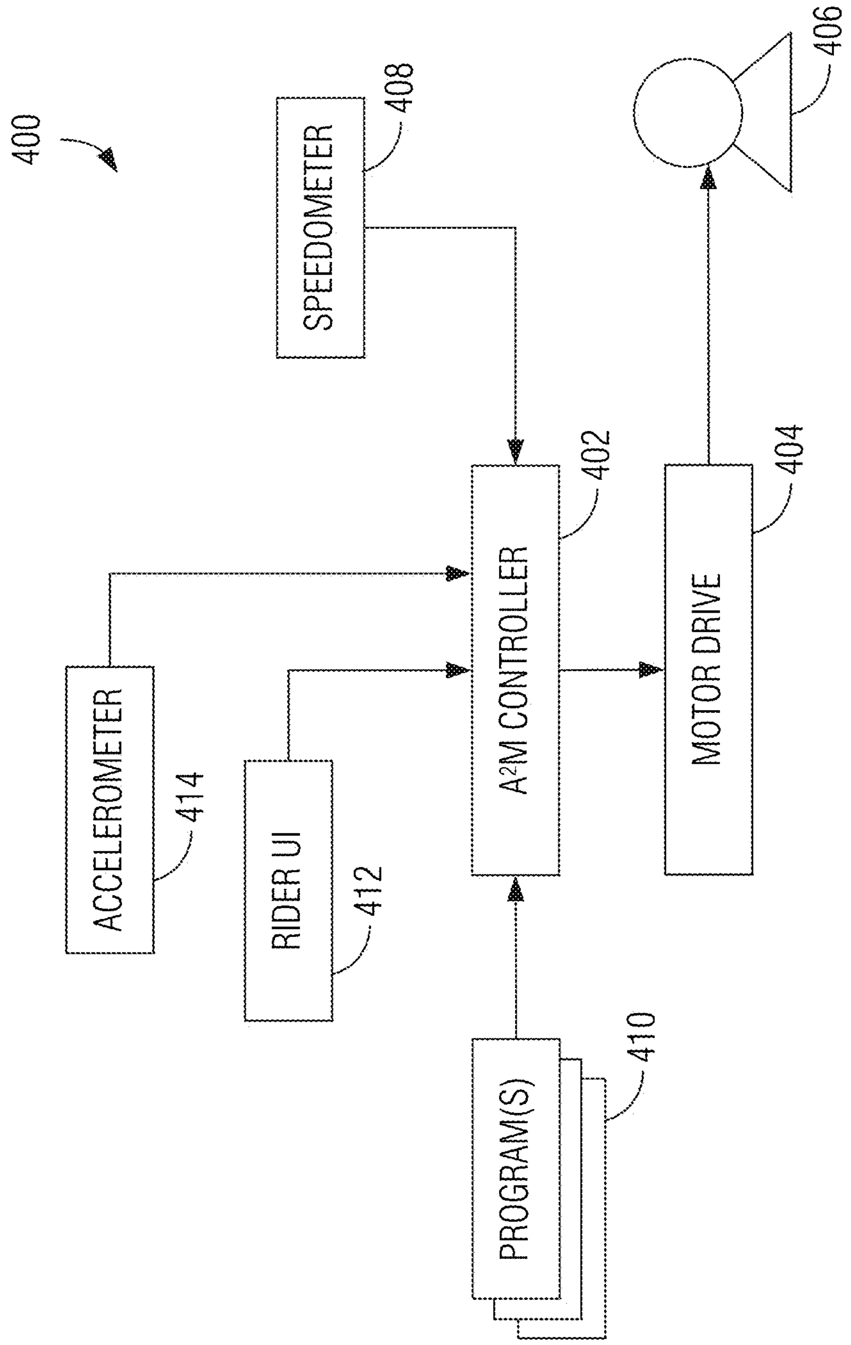
FIG. 4 is a block diagram illustrating a control arrangement 400 for an $A^2M$ system according to an example embodiment.

FIG. 4 is a block diagram illustrating a control arrangement 400 for an $A^2M$ system according to an example embodiment. $A^2M$ controller 402, which may be implemented as part of controller 130 (FIG. 1) produces a dynamic output which is fed to motor drive 404 which powers motor 406 of the $A^2M$ actuator (e.g., $A^2M$ actuator 110, 202, 212, 222) which, in turn, is coupled to a rotating mass such as a flywheel. Motion of the rotating mass imparts angular momentum into the system. The output of $A^2M$ controller 402 is dynamic in the sense that it may be varied in response to the monitored riding condition, which includes the riding velocity. The riding velocity is provided via measurement from speedometer 408, which may be implemented with a hall-effect sensor (e.g., to measure the frequency of a magnetic field produced by a permanent magnet mounted to a wheel of the bicycle), global-positioning sensor (GPS), or other suitable speed-measuring technology.

$A^2M$ controller 402 reads an AM setpoint, and adjusts the output signal accordingly. As depicted, the AM setpoint may be provided in the form of one or more AM program(s) 410. Each AM program 410 defines the angular momentum (or a variable which corresponds to the angular momentum) as a function of the present velocity. The graph of FIG. 3 is one example of such an AM program. Each $A^2M$ program 410 or logic in $A^2M$ controller 402 may include mappings or functions between the desired AM at the current velocity, the $A^2M$ output needed to achieve the desired AM at the current velocity, and the gain/offsets or functions that relate the $A^2M$ output to the appropriate input to motor drive 404 to achieve the desired AM.

In related embodiments, a rider input may be provided via rider user interface 412, which accepts real-time rider input. In one such embodiment, the $A^2M$ is based on a combination of a preset AM program 410, with settings from rider UI 412 that are user-adjustable to increase the gain, offset, or both, of the $A^2M$ actuator 110, 202, 212, 222. In another embodiment, $A^2M$ controller 402 includes a fully-manual setting permits user override of AM program(s) 410.

In a related embodiment, other inputs to $A^2M$ controller 402 include accelerometer 414, which may be used to detect certain other riding conditions besides only the velocity. For example, accelerometer 414 may be used to detect bumpiness of the terrain, or whether the bicycle is oriented uphill or downhill. These various riding conditions may call for different AM programs 410. Similarly, accelerometer 414 (or an additional sensor) may be used to detect steering frequency and amplitude or lateral movement, which can further inform $A^2M$ controller 402 of the prevailing riding conditions and refine the $A^2M$ settings or selection of AM program 410.

Figure 5A:
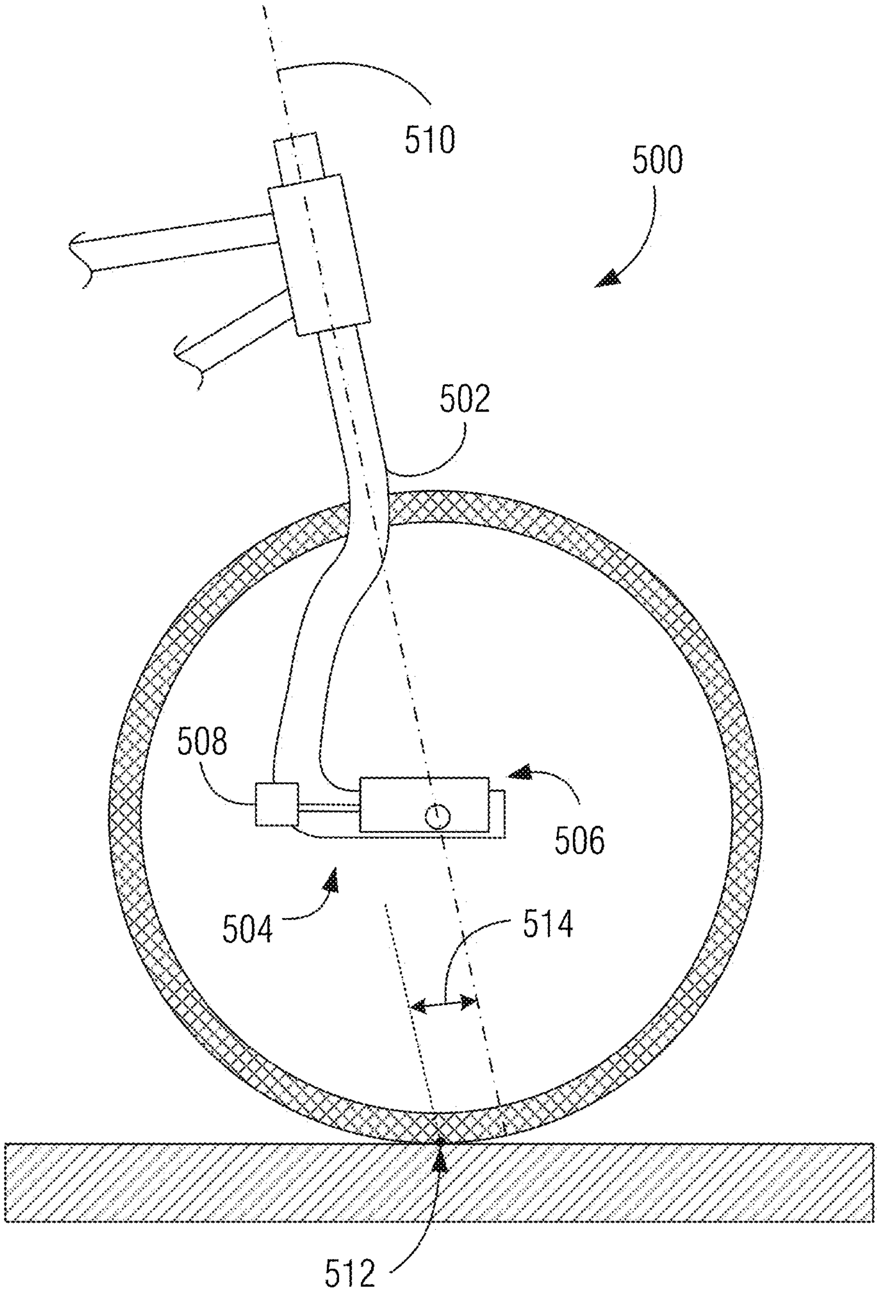
FIG. 5A is a diagram illustrating an example implementation of an adjustable trail (AT) actuator according to one type of embodiment.

FIG. 5A is a diagram illustrating an example implementation of an AT actuator according to one type of embodiment. As depicted, steering frame 500 includes fork 502, on which AT system 504 is mounted as shown. AT system includes an adjustable (e.g. slidable) coupler 506, and linear actuator 508 which moves adjustable coupler 506 forwards and backwards to vary the wheel position relative to steering frame 500. Such forward and backwards movement of the wheel position adjusts the trail, which is the distance along the riding surface between contact point 512 and steering axis 510.

Linear actuator 508 may be implemented as a servo or stepping motor with a threaded shaft extending from the rotor that engages with slidable coupler 506. Other types of linear actuators are also contemplated in various other embodiments. For instance, a pneumatic or hydraulic cylinder may be utilized to effect the linear positioning of the adjustable coupler, with movement imparted via pressurized fluid and controlled using actuated valves. In another embodiment, a cable and spring system may be utilized, which may be controlled via motorized spool to impart or release tension to/from the cable which, in turn, compresses or releases a spring.

Figure 5B:
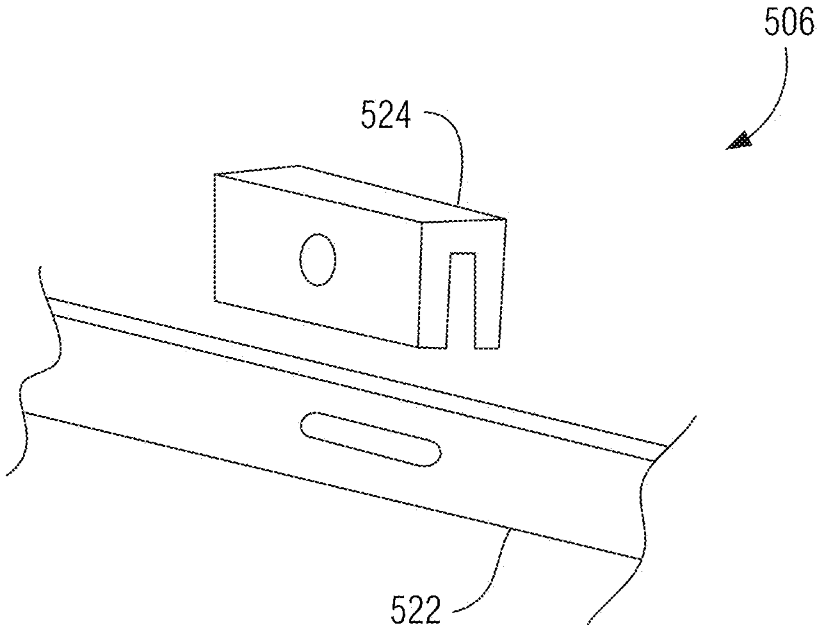
FIG. 5B is an exploded-view diagram illustrating slidable coupler of an AT system in greater detail.

FIG. 5B is an exploded-view diagram illustrating adjustable coupler 506 in greater detail. As shown, adjustable coupler 506 includes rail 522, which is an extension of fork 502, and carriage 524 that engages with rail 522 and is slidable longitudinally along rail 522. In related embodiments, rollers, bearings, or other suitable mechanism (not shown) may be provided to substantially reduce sliding friction between rail 522 and carriage 524.

Figure 5C:
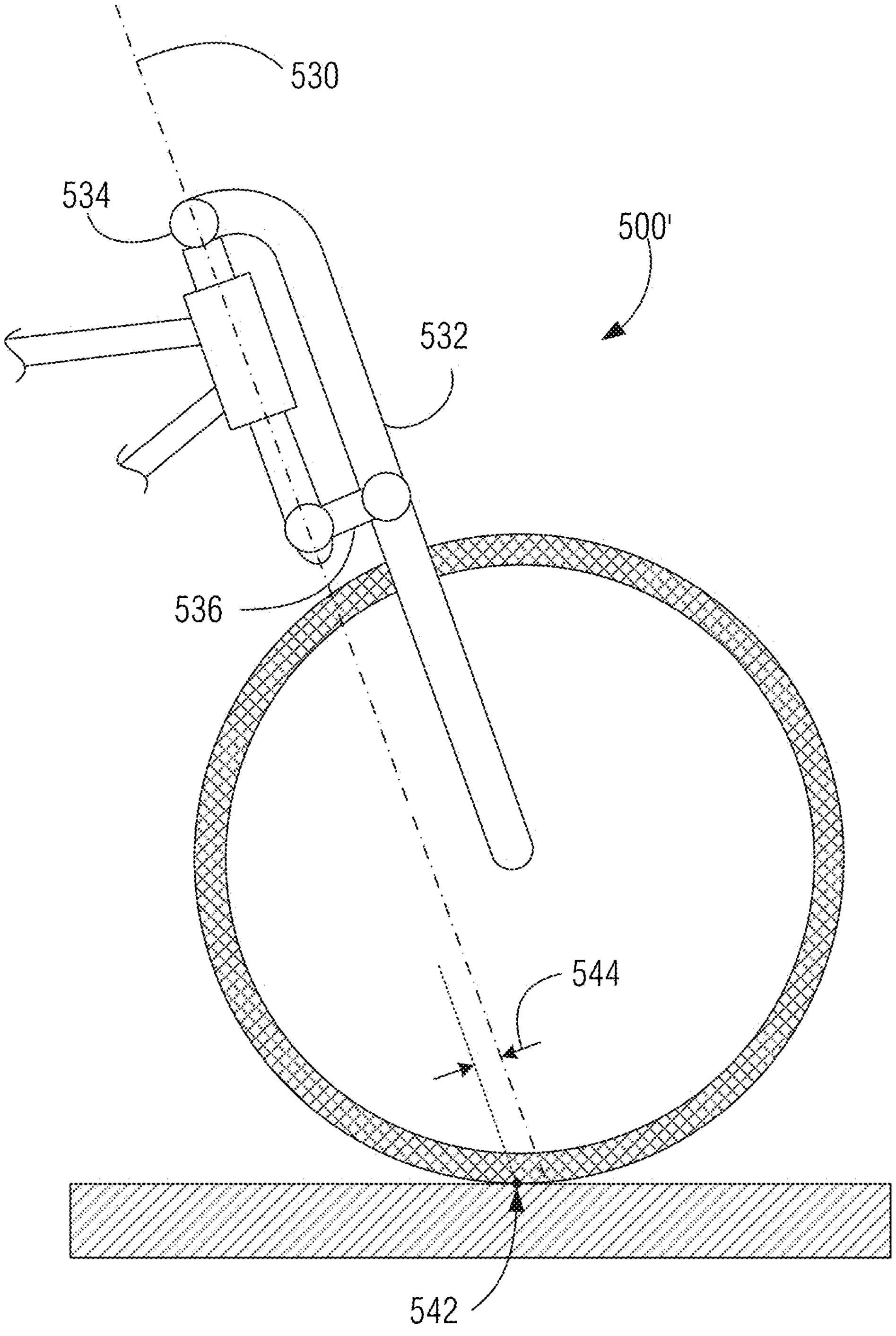
FIG. 5C is a diagram illustrating another type of mechanism that can implement an AT system.

FIG. 5C is a diagram illustrating another type of mechanism that can implement an AT system. As depicted, steering frame 500' includes fork 532 with an adjustable rake. According to one such embodiment, fork 532 pivots on hinge 534 to change the rake angle. Pivoting about hinge 534 is effected by linear actuator 536, which may be a motor-driven screw or pneumatic/hydraulic system as described above with reference to linear actuator 508, or other suitable type of linear actuator. Variation of the rake angle by actuator 536 repositions the wheel longitudinally relative to steering frame 500', thereby adjusting the trail as the distance 544 between contact point 542 and steering axis 544.

Figure 6:
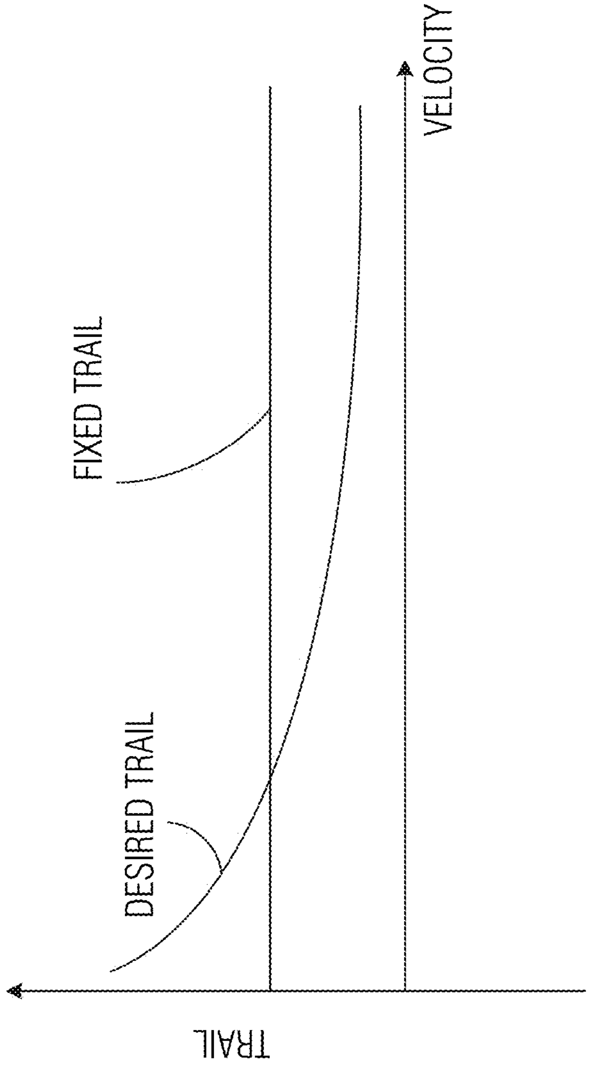
FIG. 6 is a graph illustrating dynamic setting of the AT system to vary the trail as a function of bicycle velocity according to an embodiment.

FIG. 6 is a graph illustrating dynamic setting of the AT system to vary the trail as a function of bicycle velocity according to an embodiment. As depicted, the desired trail in this example is greater at low speeds, and decreases inversely with increasing velocity. Compared to a conventional fixed trail as shown, the AT system allows the trail to be dynamically varied according to riding conditions such as the current speed. In this example, greater trail at low speed facilitates stability, whereas smaller trail at high speeds tends to prevent shimmy of the steering wheel.

Figure 7:
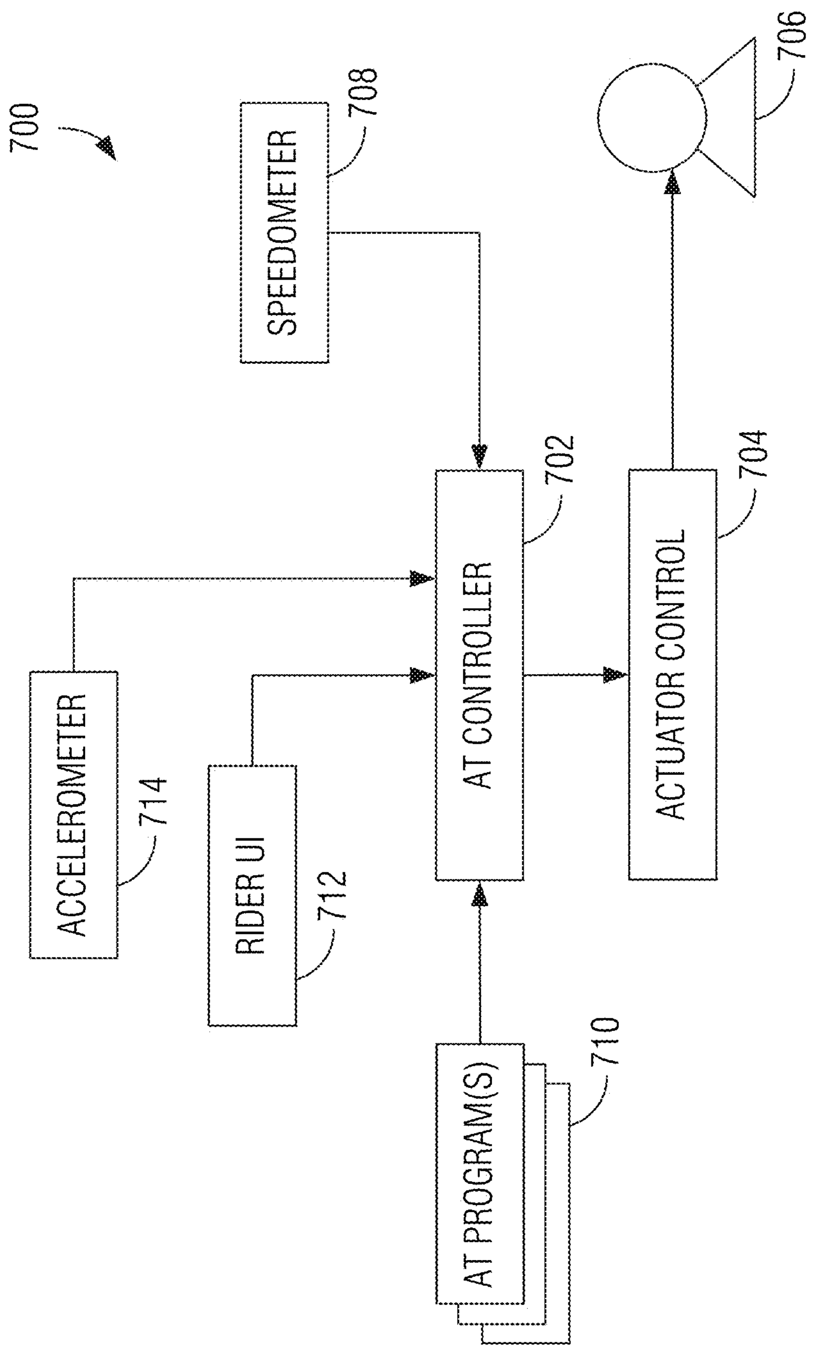
FIG. 7 is a block diagram illustrating a control arrangement for an AT system according to an example embodiment.

FIG. 7 is a block diagram illustrating a control arrangement 700 for an AT system according to an example embodiment. This control arrangement is similar to control arrangement 400 (FIG. 4) described above for control of the $A^2M$ system. AT controller 702, which may be implemented as part of controller 130 (FIG. 1) produces a dynamic output which is fed to actuator control 704 which positions motor 706 of the AT actuator (e.g., AT actuator 120, 508, 536) which, in turn, is coupled to adjustable coupler 506 (FIG. 5A) or pivotable fork 532 (FIG. 5C). Adjustment of these mechanisms results in changes to the bicycle's trail. The output of AT controller 702 is dynamic in the sense that it may be varied in response to the monitored riding condition, which includes the riding velocity. The riding velocity is provided via measurement from speedometer 708 similar to speedometer 408 described above.

AT controller 702 reads an AT setpoint, and adjusts the output signal accordingly. As depicted, the AT setpoint may be provided in the form of one or more AT program(s) 710. Each AT program 710 defines the trail (or a variable which corresponds to the trail) as a function of the present velocity. The graph of FIG. 6 is one example of such an AT program. Each AT program 710 or logic in AT controller 702 may include mappings or functions between the desired trail at the current velocity, the AT actuator position needed to achieve the desired trail at the current velocity, and the gain/offsets or functions that relate the AT actuator position to the appropriate input to actuator control 704 to achieve the desired trail. Actuator control 704 may be a servo drive circuit, a stepping motor drive circuit, a valve control circuit, or the like.

In related embodiments, a rider input may be provided via rider user interface 712, which accepts real-time rider input. In one such embodiment, the trail is based on a combination of a preset AT program 710, with settings from rider UI 712 that are user-adjustable to increase the gain, offset, or both, of the AT actuator 120, 508, 536. In another embodiment, AT controller 702 includes a fully-manual setting permits user override of AT program(s) 710.

In a related embodiment, other inputs to AT controller 702 include accelerometer 714, which may be used to detect certain other riding conditions besides only the velocity, similar to the use of accelerometer 414 described above.

Figure 8:
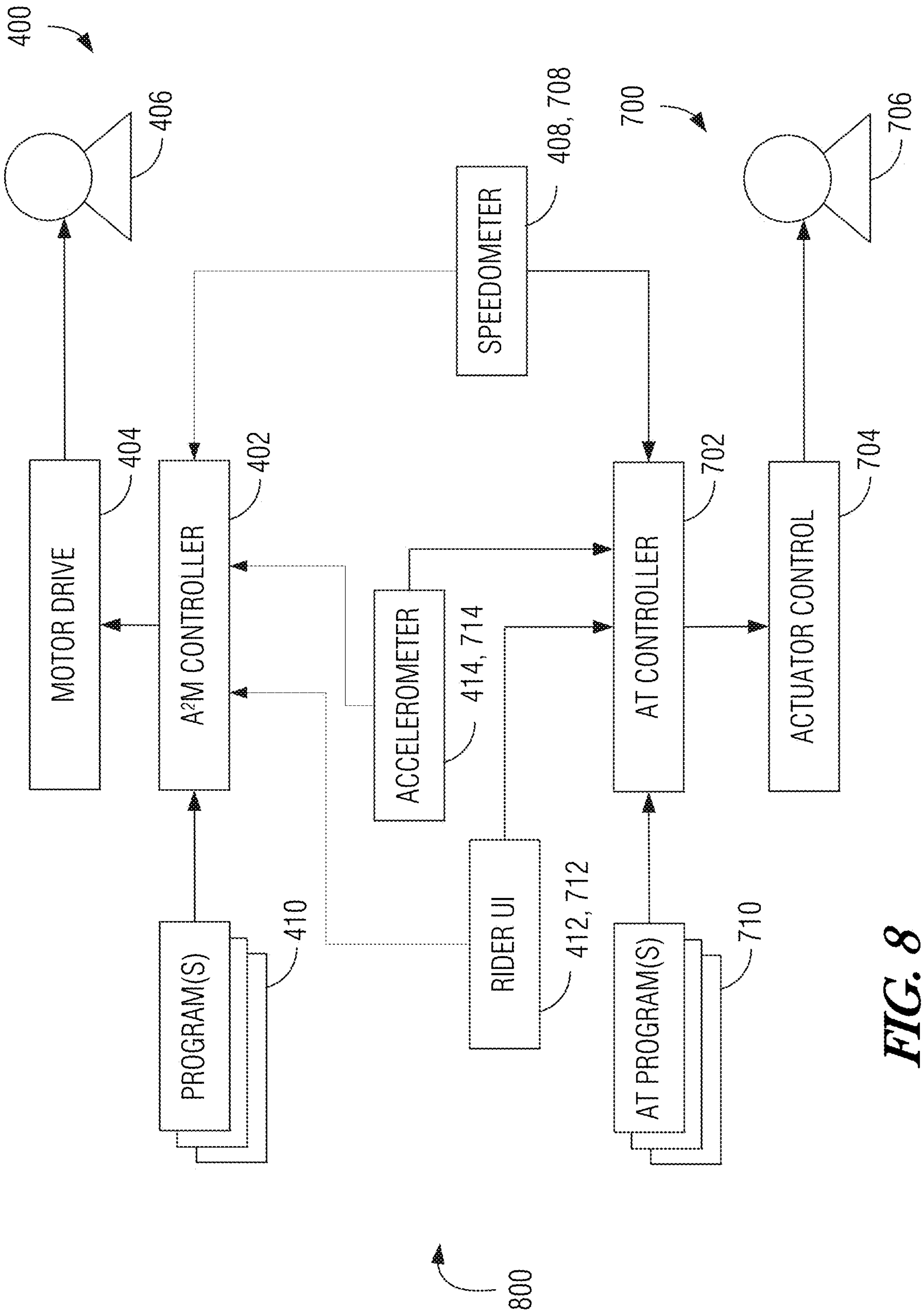
FIG. 8 is a block diagram illustrating a combined controller architecture that combines an $A^2M$ control arrangement and an AT control arrangement with certain shared inputs.

FIG. 8 is a block diagram illustrating a combined controller architecture 800 that combines $A^2M$ control arrangement 400 and AT control arrangement 700 with shared inputs. As shown, rider UI 412, 712 feeds both, $A^2M$ controller 402 and AT controller 702. Likewise, accelerometer 414, 714, as well as speedometer 408, 708, each feeds both, $A^2M$ controller 402 and AT controller 702. In this arrangement 800, $A^2M$ control and AT control are carried out independently even though the two controllers 402, 702 share the same input devices. Notably, the input from rider UI 412, 712 may be different for each controller since it is possible for $A^2M$ and AT to be independently specified by the rider. In a related embodiment, the rider input may be combined, such as a simplified setting in which the rider may select a setting on a continuum between "maximum stability" and "maximum maneuverability" at the extremes.

Figure 9:
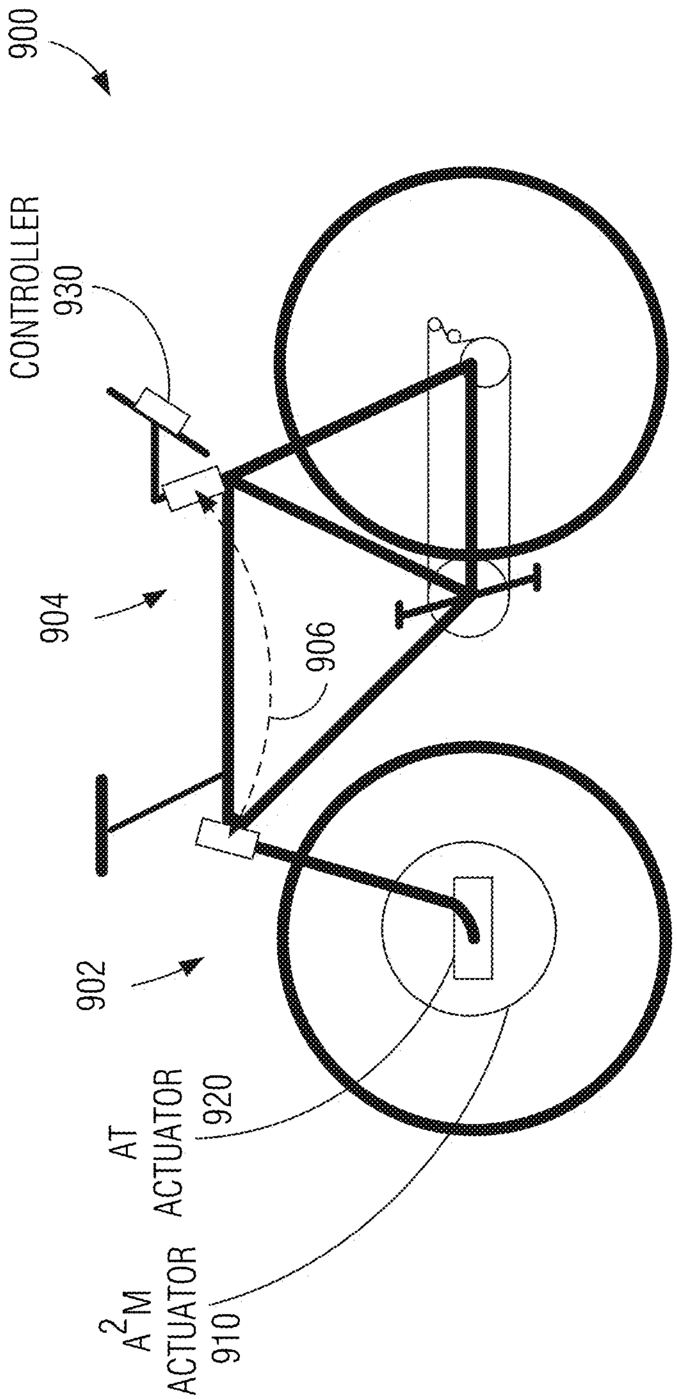
FIG. 9 is a diagram illustrating a rear-wheel steering arrangement for a bicycle which utilizes aspects of the embodiments described herein.

FIG. 9 is a diagram illustrating a rear-wheel steering arrangement for a bicycle 900, which utilizes aspects of the embodiments described herein. Bicycle 900 includes steering frame 902 at the rear of the bicycle, and main frame 904 which includes the handlebars as shown. Notably, the handlebars are coupled to the rear steering wheel using suitable coupling means, such as a linkage, cables, electromechanics, or the like. The coupling is represented schematically at 906. Notably, to in a rear-wheel steering bicycle, the rear (steering) wheel steers the steering frame in the opposite direction from the direction of the turn. This arrangement offers certain stability advantages over a front-wheel steering arrangement since the angular momentum of the steering wheel tends to have the same general orientation as the direction of tracking of the steering wheel.

Steering frame 902 includes $A^2M$ actuator 910, as well as AT actuator 920, which are similar to their respective counterparts described above, except that the programs for automated control of each system may be optimized for rear-steering dynamics. Controller 930 (which may include the rider interface) may be positioned on the handlebars to facilitate ease of use by the rider.

Additional Notes and Examples

Example 1 is a control system for a two-wheeled vehicle having a main frame and a steering frame, the control system comprising: an auxiliary angular momentum ($A^2M$) system operative to produce angular momentum to be added to, or subtracted from, angular momentum of a steering wheel that is steerable with the steering frame; and an adjustable trail (AT) system operative to vary a trail of the steering wheel; wherein the $A^2M$ system includes, an $A^2M$ actuator and an $A^2M$ controller, the $A^2M$ actuator comprising a mounting coupling, a motor, and a rotatable mass mechanically coupled to the motor, wherein the mounting coupling is constructed to maintain alignment of the rotatable mass and the steering wheel, the motor being operative to impart rotation to the rotatable mass under control of the $A^2M$ controller; wherein the AT system includes an adjustable coupler of the steering wheel to the steering frame, an AT actuator, and an AT controller, wherein the AT actuator is operative to adjust a position of the adjustable coupler under control of the AT controller.

In Example 2, the subject matter of Example 1 includes, wherein the $A^2M$ controller and AT controller are operatively coupled to a shared rider user interface and to a shared riding-condition sensor.

In Example 3, the subject matter of Example 2 includes, wherein the shared riding-condition sensor comprises an accelerometer arranged and operative to detect at least one of terrain bumpiness, uphill or downhill orientation, steering frequency and amplitude, or lateral movement, and wherein at least one of the $A^2M$ controller and the AT controller is operative to adjust program selection or parameters responsive to the accelerometer.

In Example 4, the subject matter of Examples 2-3 includes, wherein the shared rider user interface provides real-time rider inputs independently to the $A^2M$ controller and to the AT controller to adjust at least one of a gain or an offset for each controller.

In Example 5, the subject matter of Examples 2-4 includes, wherein the shared rider user interface comprises a single control having a continuum between maximum stability and maximum maneuverability, and wherein each of the $A^2M$ controller and the AT controller maps the selected position on the continuum to respective program parameters.

In Example 6, the subject matter of Examples 2-5 includes, wherein the $A^2M$ controller includes a fully-manual mode permitting rider override of preset AM programs via the rider user interface.

In Example 7, the subject matter of Examples 2-6 includes, wherein the AT controller includes a fully-manual mode permitting rider override of preset AT programs via the rider user interface.

In Example 8, the subject matter of Examples 2-7 includes, wherein the rider user interface provides separate real-time adjustments for the $A^2M$ system and the AT system that are applied concurrently during operation.

In Example 9, the subject matter of Examples 1-8 includes, wherein the $A^2M$ controller is operative to produce an $A^2M$ output signal that causes the $A^2M$ actuator to spin the rotatable mass to achieve a desired net angular momentum for the steering frame based on at least one current riding condition as measured by a riding-condition sensor.

In Example 10, the subject matter of Example 9 includes, wherein the desired net angular-momentum is inversely related to velocity over at least a portion of an operating range.

In Example 11, the subject matter of Examples 1-10 includes, wherein the AT controller is operative to produce an AT output signal that causes the AT actuator to adjust the trail based on at least one current riding condition as measured by a riding-condition sensor.

In Example 12, the subject matter of Example 11 includes, wherein the AT controller is operative to reduce the trail at higher speeds relative to lower speeds to mitigate steering shimmy.

In Example 13, the subject matter of Examples 1-12 includes, wherein the rotatable mass comprises a flywheel mechanically coupled to the motor.

In Example 14, the subject matter of Examples 1-13 includes, wherein the $A^2M$ actuator is mounted on a fork of the steering frame.

In Example 15, the subject matter of Examples 1-14 includes, wherein the $A^2M$ actuator is mounted on a stationary portion of a hub of the steering wheel.

In Example 16, the subject matter of Example 15 includes, wherein the $A^2M$ actuator mounted on the stationary hub portion includes the motor and the motor-drive circuit proximate the hub.

In Example 17, the subject matter of Examples 1-16 includes, wherein the mounting coupling comprises a hinged mount on the main frame and a coupling to the steering frame that maintains an orientation of the rotatable mass consistent with an orientation of the steering wheel during steering.

In Example 18, the subject matter of Examples 1-17 includes, wherein the $A^2M$ actuator is duplicated on opposing sides of the steering frame to improve weight distribution and increase angular-momentum control authority.

In Example 19, the subject matter of Examples 1-18 includes, wherein the motor comprises one of a DC motor, an induction motor, a brushless DC motor, or a switched-reluctance motor.

In Example 20, the subject matter of Examples 1-19 includes, wherein the $A^2M$ controller is operative to select among a plurality of AM programs, each defining desired angular momentum as a function of velocity.

In Example 21, the subject matter of Examples 1-20 includes, wherein the $A^2M$ controller is operative to vary the direction of rotation of the rotatable mass to add to, or subtract from, angular momentum of the steering wheel to achieve the selected desired angular momentum.

In Example 22, the subject matter of Examples 1-21 includes, a speedometer operative to provide riding velocity data to at least one of the $A^2M$ controller and the AT controller.

In Example 23, the subject matter of Example 22 includes, wherein the speedometer provides velocity data to both the $A^2M$ controller and the AT controller as shared inputs.

In Example 24, the subject matter of Examples 1-23 includes, wherein the AT system comprises an adjustable coupler that includes a rail extending from the fork and a carriage slidable along the rail, and a linear actuator operative to translate the carriage forwards and backwards to vary the wheel position relative to the steering frame.

In Example 25, the subject matter of Example 24 includes, wherein the linear actuator is comprises a stepping motor with a threaded shaft engaging the carriage.

In Example 26, the subject matter of Examples 24-25 includes, wherein the linear actuator comprises a motor-driven screw.

In Example 27, the subject matter of Examples 24-26 includes, wherein the adjustable coupler further comprises rollers or bearings configured to reduce sliding friction between the rail and the carriage.

In Example 28, the subject matter of Examples 1-27 includes, wherein the AT system comprises a fork with an adjustable rake that pivots about a hinge, and a linear actuator operative to vary the rake angle to reposition the wheel longitudinally relative to the steering frame and thereby adjust the trail.

In Example 29, the subject matter of Examples 24-28 includes, wherein the linear actuator comprises one of a pneumatic cylinder or a hydraulic cylinder operated by actuated valves.

In Example 30, the subject matter of Examples 24-29 includes, wherein the AT system further comprises a cable-and-spring mechanism tensioned or released by a motorized spool to reposition the adjustable coupler.

In Example 31, the subject matter of Examples 1-30 includes, wherein the AT controller is operative to select among a plurality of AT programs each defining a trail value as a function of velocity.

In Example 32, the subject matter of Example 31 includes, wherein the AT controller adjusts the trail dynamically and continuously as a function of the current velocity.

In Example 33, the subject matter of Examples 31-32 includes, wherein at least one of the AT programs specify that the desired trail is greater at low speeds and decreases with increasing velocity relative to a conventional fixed trail.

In Example 34, the subject matter of Examples 1-33 includes, wherein the $A^2M$ controller is operative to apply at least one of a gain or an offset to map a desired angular momentum at a current velocity to a motor-drive input for the $A^2M$ actuator.

In Example 35, the subject matter of Examples 1-34 includes, wherein the AT controller is operative to apply at least one of a gain or an offset to map a desired trail at the current velocity to an actuator-control input for the AT actuator.

In Example 36, the subject matter of Examples 1-35 includes, wherein the $A^2M$ controller and the AT controller are implemented as modules of a common controller configured to process shared inputs while effecting independent control of the $A^2M$ actuator and the AT actuator.

In Example 37, the subject matter of Examples 1-36 includes, wherein the two-wheeled vehicle is configured for rear-wheel steering and the $A^2M$ actuator and the AT actuator are mounted on a rear steering frame.

In Example 38, the subject matter of Example 37 includes, a coupling between handlebars on a main frame and the rear steering wheel, the coupling comprising at least one of a linkage, cables, and/or an electromechanical arrangement.

In Example 39, the subject matter of Examples 1-38 includes, wherein the $A^2M$ actuator is configured such that an axis of rotation of the rotatable mass remains aligned with an axis of rotation of the steering wheel during steering motion.

In Example 40, the subject matter of Examples 1-39 includes, wherein the $A^2M$ controller and the AT controller are each operative to adjust at least one of selected programs or program parameters responsive to detection, by the accelerometer, of uphill or downhill orientation.

In Example 41, the subject matter of Examples 1-40 includes, wherein the $A^2M$ controller is operative to command negative angular momentum of the rotatable mass relative to rotation of the steering wheel at higher velocities to reduce net angular momentum of the steering wheel.

In Example 42, the subject matter of Examples 1-41 includes, wherein the AT actuator is operative to reposition the steering wheel forwards and backwards relative to the steering frame to change a distance between a ground contact point of the steering wheel and a steering axis.

In Example 43, the subject matter of Examples 1-42 includes, wherein the $A^2M$ controller and the AT controller each store multiple programs and are operative to select a program based on at least one of velocity, terrain bumpiness, steering frequency, lateral movement, or grade.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A control system for a two-wheeled vehicle having a main frame and a steering frame, the control system comprising:

an auxiliary angular momentum ($A^2M$) system operative to produce angular momentum to be added to, or subtracted from, angular momentum of a steering wheel that is steerable with the steering frame; and an adjustable trail (AT) system operative to vary a trail of the steering wheel;

wherein the $A^2M$ system includes an $A^2M$ actuator and an $A^2M$ controller, the $A^2M$ actuator comprising a mounting coupling, a motor, and a rotatable mass mechanically coupled to the motor, wherein the mounting coupling is constructed to maintain alignment of the rotatable mass and the steering wheel, the motor being operative to impart rotation to the rotatable mass under control of the $A^2M$ controller; and wherein the AT system includes an adjustable coupler of the steering wheel to the steering frame, an AT actuator, and an AT controller, wherein the AT actuator is operative to adjust a position of the adjustable coupler under control of the AT controller;

wherein the $A^2M$ controller and AT controller are operatively coupled to a shared rider user interface and to a shared riding-condition sensor; and wherein the rider user interface provides separate real time adjustments for the $A^2M$ system and the AT system that are applied concurrently during operation.

2. The system of claim 1, wherein the shared riding-condition sensor comprises an accelerometer arranged and operative to detect at least one of terrain bumpiness, uphill or downhill orientation, steering frequency and amplitude, or lateral movement, and wherein at least one of the $A^2M$ controller and the AT controller is operative to adjust program selection or parameters responsive to the accelerometer.

3. The system of claim 1, wherein the shared rider user interface comprises a single control having a continuum between maximum stability and maximum maneuverability, and wherein each of the $A^2M$ controller and the AT controller maps the selected position on the continuum to respective program parameters.

4. The system of claim 1, wherein the $A^2M$ controller is operative to produce an $A^2M$ output signal that causes the $A^2M$ actuator to spin the rotatable mass to achieve a desired net angular momentum for the steering frame based on at least one current riding condition as measured by the riding-condition sensor.

5. The system of claim 1, wherein the AT controller is operative to produce an AT output signal that causes the AT actuator to adjust the trail based on at least one current riding condition as measured by the riding-condition sensor.

6. The system of claim 1, wherein the mounting coupling comprises a hinged mount on the main frame and a coupling to the steering frame that maintains an orientation of the rotatable mass consistent with an orientation of the steering wheel during steering.

7. The system of claim 1, wherein the $A^2M$ actuator is duplicated on opposing sides of the steering frame to improve weight distribution and increase angular momentum control authority.

8. The system of claim 1, wherein the $A^2M$ controller is operative to select among a plurality of angular-momentum (AM) programs, each defining desired angular momentum as a function of velocity.

9. The system of claim 1, wherein the $A^2M$ controller is operative to vary the direction of rotation of the rotatable mass to add to, or subtract from, angular momentum of the steering wheel to achieve a selected desired angular momentum.

10. The system of claim 1, wherein the AT system comprises an adjustable coupler that includes a rail extending from a fork of the steering frame and a carriage slidable along the rail, and a linear actuator operative to translate the carriage forwards and backwards to vary the wheel position relative to the steering frame.

11. The system of claim 1, wherein the AT system comprises a fork with an adjustable rake that pivots about a hinge, and a linear actuator operative to vary the rake angle to reposition the steering wheel longitudinally relative to the steering frame and thereby adjust the trail.

12. The system of claim 1, wherein the $A^2M$ controller and the AT controller are implemented as modules of a common controller configured to process shared inputs while effecting independent control of the $A^2M$ actuator and the AT actuator.

13. The system of claim 1, wherein the two-wheeled vehicle is configured for rear wheel steering and the $A^2M$ actuator and the AT actuator are mounted on a rear steering frame.

14. The system of claim 13, further comprising a coupling between handlebars on a main frame and the rear steering wheel, the coupling comprising at least one of a linkage, cables, and/or an electromechanical arrangement.

15. The system of claim 1, wherein the $A^2M$ actuator is configured such that an axis of rotation of the rotatable mass remains aligned with an axis of rotation of the steering wheel during steering motion.

16. The system of claim 1, wherein the $A^2M$ controller and the AT controller are each operative to adjust at least one of selected programs or program parameters responsive to detection, by an accelerometer, of uphill or downhill orientation.

17. The system of claim 1, wherein the $A^2M$ controller is operative to command negative angular momentum of the rotatable mass relative to rotation of the steering wheel at higher velocities to reduce net angular momentum of the steering wheel.

18. The system of claim 1, wherein the $A^2M$ controller and the AT controller each store multiple programs and are operative to select a program based on at least one of velocity, terrain bumpiness, steering frequency, lateral movement, or grade.

* * * * *